United States Patent
Rath et al.

(10) Patent No.: US 11,706,407 B2
(45) Date of Patent: Jul. 18, 2023

(54) ADAPTATION OF SELECTION OF MOST PROBABLE MODE CANDIDATES DEPENDING ON BLOCK SHAPE

(71) Applicant: InterDigital Madison Patent Holdings, SAS, Paris (FR)

(72) Inventors: Gagan Rath, Cesson-Sevigne (FR); Fabien Racape, Los Altos, CA (US); Fabrice Urban, Cesson-Sevigne (FR)

(73) Assignee: InterDigital Madison Patent Holdings, SAS, Paris (FR)

(*) Notice: Subject to any disclaimer, the term of this patent is extended or adjusted under 35 U.S.C. 154(b) by 175 days.

(21) Appl. No.: 17/276,665

(22) PCT Filed: Nov. 7, 2019

(86) PCT No.: PCT/US2019/060266
§ 371 (c)(1),
(2) Date: Mar. 16, 2021

(87) PCT Pub. No.: WO2020/102000
PCT Pub. Date: May 22, 2020

(65) Prior Publication Data
US 2022/0038680 A1 Feb. 3, 2022

(30) Foreign Application Priority Data
Nov. 14, 2018 (EP) .................................. 18306490

(51) Int. Cl.
*H04N 19/159* (2014.01)
*H04N 19/176* (2014.01)
(Continued)

(52) U.S. Cl.
CPC ......... *H04N 19/105* (2014.11); *H04N 19/159* (2014.11); *H04N 19/176* (2014.11); *H04N 19/189* (2014.11)

(58) Field of Classification Search
CPC .................................................... H04N 19/105
See application file for complete search history.

(56) References Cited

U.S. PATENT DOCUMENTS 11,290,744 B2 * 3/2022 Lim .................... H04N 19/96
2017/0374369 A1 * 12/2017 Chuang ............... H04N 19/593
(Continued)

FOREIGN PATENT DOCUMENTS

EP       3399754 A1    11/2018

OTHER PUBLICATIONS

Kotra et al., "A simple 6-MPM list contructions with truncated binary coding for non-MPM signalling", Document: JVET-L0222-v2, Joint Video Experts Team (JVET) of ITU-T SG 16 WP 3 and ISO/IEC JTC 1/SC 29/WG 11, 12th Meeting: Macaco, CN, pp. 1-6, Oct. 3-12, 2018.

(Continued)

*Primary Examiner* — Irfan Habib
(74) *Attorney, Agent, or Firm* — Xiaoan Lu

(57) ABSTRACT

At least a method and an apparatus are provided for efficiently encoding or decoding video. For example, a most probable mode (MPM) list comprising a number of intra prediction mode candidates for a current block is obtained depending on a shape of the current block. The current block is then encoded or decoded based on the obtained most probable mode list.

20 Claims, 8 Drawing Sheets

(51) Int. Cl.
 *H04N 19/189* (2014.01)
 *H04N 19/105* (2014.01)

(56) References Cited

U.S. PATENT DOCUMENTS

2018/0098064 A1* 4/2018 Seregin .................. H04N 19/11
2020/0169752 A1* 5/2020 Rath ...................... H04N 19/11
2021/0185326 A1* 6/2021 Wang ................... H04N 19/105
2021/0250577 A1* 8/2021 Leleannec ............ H04N 19/159

OTHER PUBLICATIONS

Seregin et al., "Neighbor Based Intra Most Probable Modes List Derivation", Joint Video Exploration Team (JVET) of ITU-T SG 16 WP 3 and ISO/IEC JTC 1/SC 29/WG 11, Document: JVET-C0055, 3rd Meeting, Geneva, Switzerland, pp. 1-4, May 26, 2016.
Auwera et al., "Description of Core Experiment 3 (CE3): Intra Prediction and Mode Coding", Document: JVET-K1023, 11th JVET Meeting, Ljubljana, SI, pp. 1-35, Jul. 2018.
Anonymous, "High Efficiency Video Coding", Series H: Audiovisual and Multimedia Systems, Infrastructure of Audiovisual Services—Coding of Moving Video, International Telecommunication Union (ITU), Recommendation ITU-T H.265, pp. 1-692, Feb. 2018.

* cited by examiner

US 11,706,407 B2

ADAPTATION OF SELECTION OF MOST PROBABLE MODE CANDIDATES DEPENDING ON BLOCK SHAPE

This application claims the benefit, under 35 U.S.C. § 371 of International Application No. PCT/US2019/060266, filed Nov. 7, 2019, which was published on May 22, 2020, which claims the benefit of European Patent Application No. EP18306490.6 filed Nov. 14, 2018.

TECHNICAL FIELD

At least one of the present embodiments generally relates to a method or an apparatus for video encoding or decoding, and more particularly, to a method or an apparatus for providing efficient video compression with adaptation of selection of one or more most probable modes (MPM) depending on block shape.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transformation, and prediction.

Recent additions to video compression technology include various industry standards, versions of the reference software and/or documentations such as Joint Exploration Model (JEM) and later VTM (Versatile Video Coding (VVC) Test Model) being developed by the JVET (Joint Video Exploration Team) group. These additions aim to make further improvements to the existing HEVC (High Efficiency Video Coding) standard.

SUMMARY

The drawbacks and disadvantages of the prior art are solved and addressed by one or more aspects described herein.

According to an embodiment, a method for video encoding is provided, comprising: obtaining a most probable mode (MPM) list comprising a number of intra prediction mode candidates for a current block depending on a shape of the current block; and encoding the current block based on the most probable mode list.

According to another embodiment, a method for video decoding is provided, comprising: obtaining a most probable mode (MPM) list comprising a number of intra prediction mode candidates for a current block depending on a shape of the current block; and decoding the current block based on the most probable mode list.

According to another embodiment, an apparatus for video decoding is presented, comprising one or more processors, wherein said one or more processors are configured to: obtain a most probable mode (MPM) list comprising a number of intra prediction mode candidates for a current block depending on a shape of the current block; and decode the current block based on the most probable mode list.

According to another embodiment, an apparatus for video encoding is presented, comprising one or more processors, wherein said one or more processors are configured to: obtain a most probable mode (MPM) list comprising a number of intra prediction mode candidates for a current block depending on a shape of the current block; and encode the current block based on the most probable mode list.

According to another embodiment, a signal comprising encoded video is formed by performing: obtaining a most probable mode (MPM) list comprising a number of intra prediction mode candidates for a current block depending on a shape of the current block; encoding the current block based on the most probable mode list; and forming the bitstream comprising the encoded current block.

DETAILED DESCRIPTION

Figure 1A:
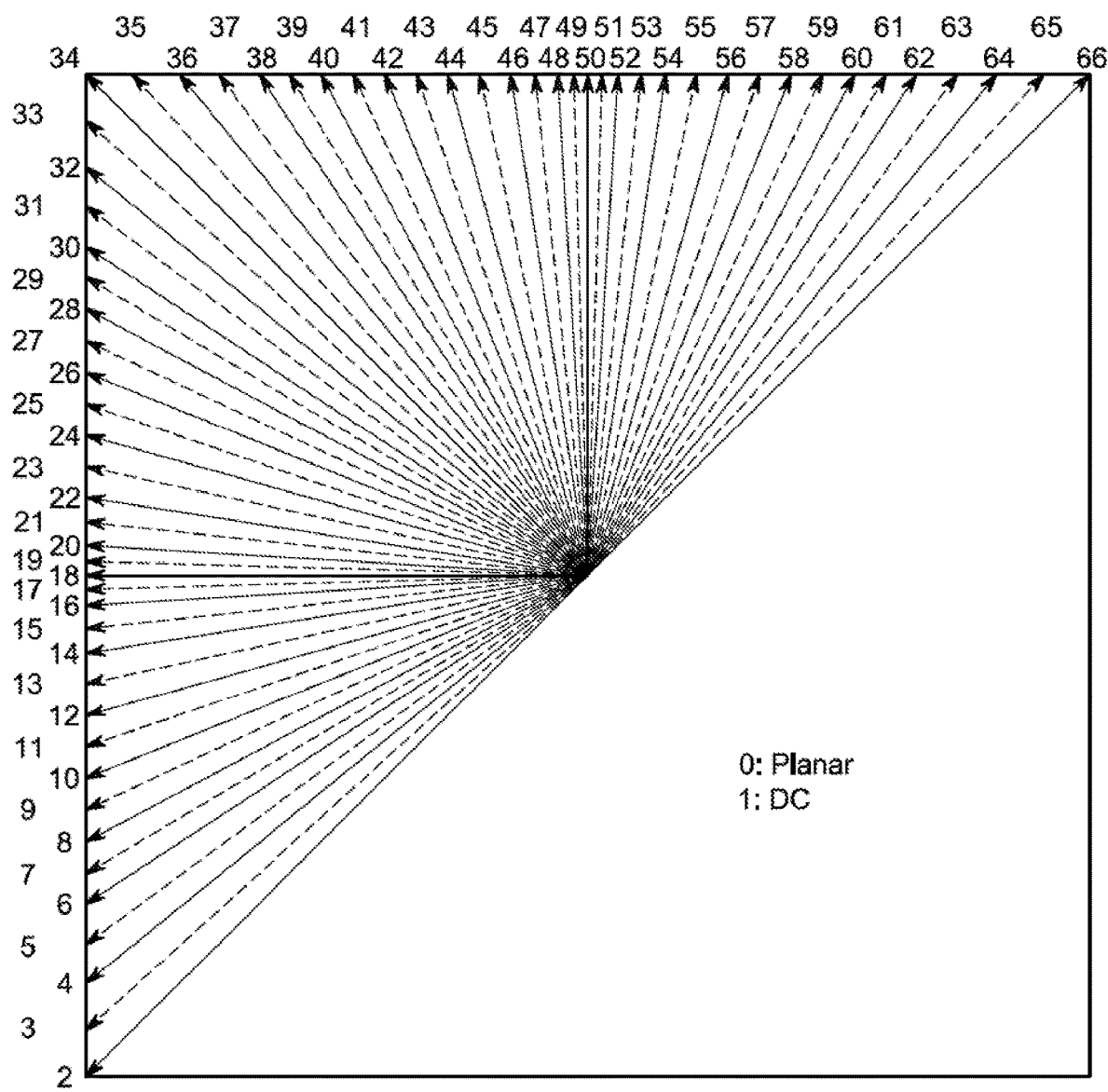
FIG. 1A illustrates intra prediction directions in VTM.

The present application addresses intra-prediction mode coding, for example, the one used in Versatile Video Coding (VVC) VTM 2.0.1 codec (see "Description of Core Experiment 3 (CE3): Intra Prediction and Mode Coding," G. Van der Auwera, J. Heo, and A. Filippov, JVET-K1023, 11th JVET Meeting, Ljubljana, SI, July 2018). In the JVET meeting held in Macao in October 2018, it was adopted to use a most probable mode (MPM) list of six prediction modes instead of three modes (JVET-L0222, see "CE3 6.6.1: A simple 6-MPM list construction with truncated binary coding for non-MPM signalling", A. M. Kotra et al, JVET-L0222, 12th JVET Meeting, Macao, CN, October 2018.), which had been earlier brought forth from the HEVC/H.265 standard.

However, the six modes are not derived using the prediction modes of all causal neighbors (left, top, below-left, top right and top left) and some default modes like PLANAR and DC, as adopted earlier in Joint Exploration Model (JEM) (see "Neighbor based intra most probable modes list derivation", V. Seregin, X. Zhao, A. Said, M. Karczewicz. JVET-O0055, JVET Meeting, May 2016, Geneva, Switzerland). Instead, the newly proposed MPM list construction is derived from the modes of only the left and top neighbor blocks and a few default modes such as PLANAR, DC, purely vertical (mode 50) and horizontal modes (mode 18). The order of these prediction modes is important since a truncated unary code is used to signal the candidate prediction mode in the list. In this application, we propose to construct and adapt the order of the modes in the MPM set according to the block shape.

The proposed embodiments aim at improving the intra prediction mode coding. In the following, intra prediction mode coding improvement is descried for the luma component in VTM 2.0.1 codec. However, the present embodiments are not limited to VTM 2.0.1 codec, rather, they can be applied to other codecs. When a block is rectangular, we give preference to the left or top neighbor block depending on if the block is flat or tall, respectively. When the prediction modes of the left and top neighbor blocks, called the leftMode and aboveMode, are not equal, we include in the MPM set the adjacent modes of the leftMode (aboveMode) if the block is flat (tall) besides the leftMode, aboveMode, PLANAR and DC. Furthermore, we also place the leftMode (aboveMode) first if the block is flat (tall). Similarly, we include, in the default modes, the adjacent modes of HOR_IDX (VER_IDX) if the block is flat (tall). Doing so, we aim to increase the probability of finding the best candidate mode with a lower index, which results in a shorter code and thus better coding performance.

In VVC VTM 2.0.1, encoding of a frame of video sequence is based on a quadtree (QT) or Multi-type tree (MTT) block partitioning structure. A frame is divided into square coding tree units (CTUs) which can undergo quadtree or multi-type tree partitioning into smaller coding units (CUs) based on rate-distortion criteria. Each CU is either intra-predicted, that is, it is spatially predicted from the causal neighbor CUs which are already decoded, or inter-predicted, that is, it is temporally predicted from the reference frames already decoded. In I-slices, all CUs are intra-predicted, whereas in P and B slices the CUs can be either intra or inter-predicted.

For intra prediction, VTM 2.0.1 defines 67 prediction modes which include one PLANAR mode (indexed as mode 0), one DC mode (indexed as mode 1) and 65 angular modes (indexed as modes 2-66), as shown in FIG. 1A. The angular modes are aimed to model directionality in different object structures whereas the PLANAR and DC modes aim at modelling gradual and slowly changing intensity regions. A target block can be tested with different prediction modes for the rate-distortion performance and the best mode is signaled to the decoder.

To minimize the signaling bits required for the prediction mode for a luma block, VTM 2.0.1 uses the concept of the most probable modes (MPM), which was used in HEVC/H.265 standard. The idea is to construct a list of three most likely prediction modes using the prediction modes of the left and top neighbor blocks, and some default modes like PLANAR, DC and vertical (VER_IDX) modes. If the prediction mode of the target block belongs to the list, then the flag, called mpmFlag, is set as '1' and the index of the candidate mode in the MPM list is encoded using a variable length code. Else the mpmFlag is set as '0' and the index of the prediction mode in the remaining set of 64 modes is fixed length coded (FLC) using six bits. At the JVET meeting held in Macao in October 2018, it was agreed to use an MPM list consisting of six modes instead of three modes (see JVET-L0222). If the prediction mode of the target block belongs to the MPM list, then the mpmFlag is set as '1' and then the index of the mode in the MPM list is encoded using a variable length code. Else the mpmFlag is set as '0' and the index of the prediction mode in the remaining set of 61 modes is encoded using a truncated binary code of 5 or 6 bits.

The aim of the proposed embodiments is to improve the construction of the MPM list. The order of the modes in the MPM set has implications on the coding performance since the index of the matching candidate mode is variable length coded. To have higher coding performance, it is meaningful to order the modes in a manner that results in most probable MPM modes to have lower indices than the less probable MPM modes. In this disclosure, we propose to order the modes according to the shape of the target block. Before we present our method, we will first describe the MPMs used in VTM 2.0.1 and the adopted contribution for 6 MPMs in JVET-L0222.

Intra Prediction Mode Encoding in VTM 2.0.1

Figure 1B:
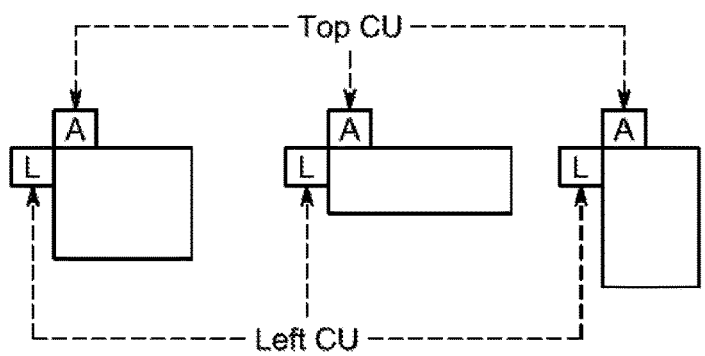
FIG. 1B illustrates above and left reference locations for deriving a MPM list in VTM.

VTM 2.0.1 codec specifies a MPM list consisting of three distinct modes, which is constructed from the prediction modes of the intra coded CUs on the top and left of the current CU, the PLANAR mode (index=0, also called PLANAR_IDX), the DC mode (index=1, also called DC_IDX), and the directly vertical mode (index=50, also called VER_IDX). The top and left CUs are located at the top-left edge of the target CU, and are shown in FIG. 1B.

Table 1 shows how the MPM list is derived in VTM 2.0.1, depending on the left and top blocks' prediction modes. Here, L denotes the prediction mode of the left CU (also called leftMode) and A denotes the prediction mode of the top CU (also called aboveMode).

TABLE 1

MPM derivation in VTM 2.0.1

| | Conditions | | MPM[0] | MPM[1] | MPM[2] |
|---|---|---|---|---|---|
| L = A | L ≠ PLANAR_IDX and L ≠ DC_IDX | | L | L − 1 | L + 1 |
| | Otherwise | | PLANAR_IDX | DC_IDX | VER_IDX |
| L ≠ A | L ≠ PLANAR_IDX and A ≠ PLANAR_IDX | | L | A | PLANAR_IDX |
| | Otherwise | L ≠ DC_IDX and A ≠ DC_IDX | L | A | DC_IDX |
| | | Otherwise | L | A | VER_IDX |

If the prediction mode of the current block is equal to one of these three modes, this is indicated by setting the mpm-Flag to 1 and then encoding the candidate mode from the MPM list using a simple variable length coding scheme, as shown in Table 2.

TABLE 2

MPM encoding in VTM 2.0.1

| Candidate | binarization |
| --- | --- |
| MPM[0] | 0 |
| MPM[1] | 10 |
| MPM[2] | 11 |

If the prediction mode is not equal to any of the modes in the MPM list, then the mpmFlag is set to 0 and the selected mode from the remaining 64 modes is indicated using a 6-bit fixed length code.

Intra Prediction Mode Encoding in JVET-L0222

Figure 2:
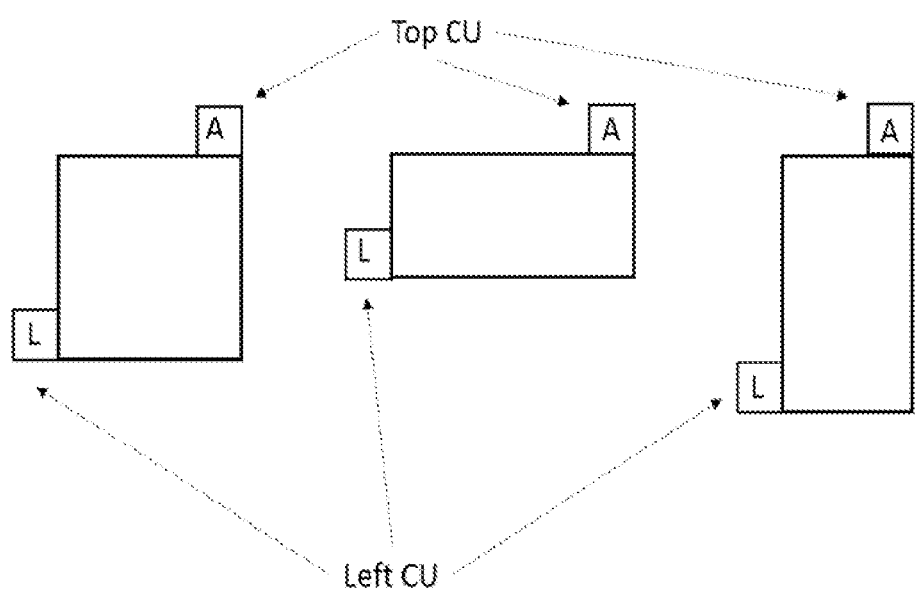
FIG. 2 illustrates another example of using above and left reference locations for deriving a MPM list.

At the JVET meeting held in Macao in October 2018, the proposal of using six MPMs from JVET-L0222 was adopted. Here the MPM list is constructed from the prediction modes of the intra coded CUs on the top and left of the current CU and some default modes. The top and left CUs are at the right and bottom edge of the target block, respectively, than at the top-left corner, as shown in FIG. 2. The default modes are the PLANAR mode, the DC mode, the directly vertical mode VER_IDX (index=50), and the directly horizontal mode HOR_IDX (index=18).

In JVET-L0222, the MPM list is constructed as follows, where "!" is the complement operator. If L is 0, !L is 1 (DC_IDX). Else (i.e., L>0), !L=0 (PLANAR_IDX):

$L$ = prediction mode of the left CU (value in range [0-66])
$A$ = prediction mode of the above CU (value in range [0-66])
offset = NUM_LUMA_MODES − 5 (= 62)
mod = offset + 3 (= 65)
Initialization:
    MPM[0] = L;
    MPM[1] = !L
    MPM[2] = VER_IDX
    MPM[3] = HOR_IDX
    MPM[4] = VER_IDX − 4
    MPM[5] = VER_IDX + 4
If L = A
    If L > DC_IDX
        MPM[0] = L;
        MPM[1] = PLANAR_IDX
        MPM[2] = DC_IDX
        MPM[3] = ((L + offset) % mod) + 2
        MPM[4] = ((L − 1) % mod) + 2
        MPM[5] = ((L + offset − 1) % mod) + 2
    Else,
    Use initialized values.
Else (i.e. if L ≠ A)
    If L > DC_IDX and A > DC_IDX
        MPM[0] = L;
        MPM[1] = A
        MPM[2] = PLANAR_IDX
        MPM[3] = DC_IDX $$MPM[4] = ((\max(L, A) + \text{offset}) \% \text{mod}) + 2, \text{ if } L \text{ and } A \text{ are not adjacent}$$
$$= ((\max(L, A) + \text{offset} - 1) \% \text{mod}) + 2, \text{ otherwise}$$

$$MPM[5] = ((\max(L, A) - 1) \% \text{mod}) + 2, \text{ if } L \text{ and } A \text{ are not adjacent}$$
$$= ((\max(L, A) - 0) \% \text{mod}) + 2, \text{ otherwise}$$

Else if L + A ≥ 2 (i.e., only one out of L and A is either DC or PLANAR)
        MPM[0] = L;
        MPM[1] = A
        MPM[2] = !(min(L, A))
        MPM[3] = ((max(L, A) + offset) % mod) + 2
        MPM[4] = ((max(L, A) − 1) % mod) + 2
        MPM[5] = ((max(L, A) + offset − 1) % mod) + 2
    Else (i.e. one of L and A is PLANAR and the other is DC)
        Use the initialized values.
Observe that, when L is angular (i.e. 2 ≤ L ≤ 66)

$$((L + \text{offset}) \% \text{mod}) + 2 = L - 1, \text{ if } L > 2$$
$$= 66, \text{ otherwise}$$

$$((L + \text{offset} - 1) \% \text{mod}) + 2 = L - 2, \text{ if } L > 3$$
$$= 66, \text{ if } L = 3$$
$$= 65, \text{ if } L = 2$$

$((L-1) \% \text{ mod}) + 2 = L + 1, \text{ if } L < 66$
$\qquad = 2, \text{ otherwise}$ $((L-0) \% \text{ mod}) + 2 = L + 2, \text{ if } L < 65$
$\qquad = 2, \text{ if } L = 65$
$\qquad = 3, \text{ if } L = 66$ Therefore, using circular adjacency over the range [2-66] (i.e., 2 and 66 are adjacent), we can equivalently write
$((L + \text{offset}) \% \text{ mod}) + 2 \equiv L - 1$
$((L + \text{offset} - 1) \% \text{ mod}) + 2 \equiv L - 2$
$((L - 1) \% \text{ mod}) + 2 \equiv L + 1$
$((L - 0) \% \text{ mod}) + 2 \equiv L + 2$ Using these equivalence relationships, we can show the MPM list derivation for different cases as in Table 3.

TABLE 3

MPM derivation in JVET-L0222

| Conditions | | MPM[0] | MPM[1] | MPM[2] | MPM[3] | MPM[4] | MPM[5] |
|---|---|---|---|---|---|---|---|
| L = A | L ≠ PLANAR_IDX and L ≠ DC_IDX | L | PLANAR_IDX | DC_IDX | L − 1 | L + 1 | L − 2 |
|  | Otherwise | L | !L | VER_IDX | HOR_IDX | VER_IDX − 4 | VER_IDX + 4 |
| L ≠ A | L > DC and A > DC | L | A | PLANAR_IDX | DC_IDX | Max(L, A) − 2, if L and A are adjacent else max(L, A) − 1 | Max(L, A) + 2, if L and A are adjacent else max(L, A) + 1 |
|  | Otherwise L + A ≥ 2 | L | A | !Min(L, A) | Max(L, A) − 1 | Max(L, A) + 1 | Max(L, A) − 2 |
|  | otherwise | L | A | VER_IDX | HOR_IDX | VER_IDX − 4 | VER_IDX + 4 |

If the prediction mode of the current block is equal to one of the six MPM modes, this is indicated by setting the mpmFlag to 1 and then encoding the candidate mode from the MPM set using the variable length coding scheme shown in Table 4.

TABLE 4

MPM encoding in JVET-L0222

| Candidate Index | code |
|---|---|
| MPM[0] | 0 |
| MPM[1] | 10 |
| MPM[2] | 110 |
| MPM[3] | 1110 |
| MPM[4] | 11110 |
| MPM[5] | 11111 |

Proposed MPM List Generation

Figure 3:
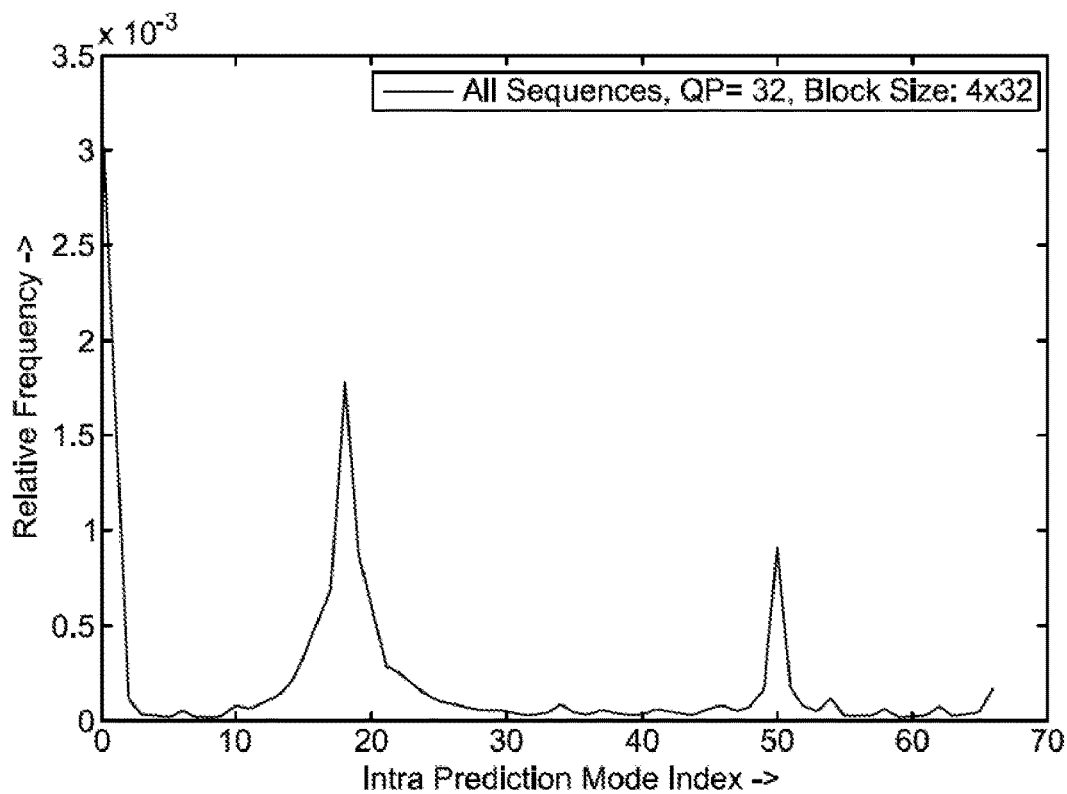
FIG. 3 illustrates relative frequency of prediction modes for a target with height=4 and width=32.
Figure 4:
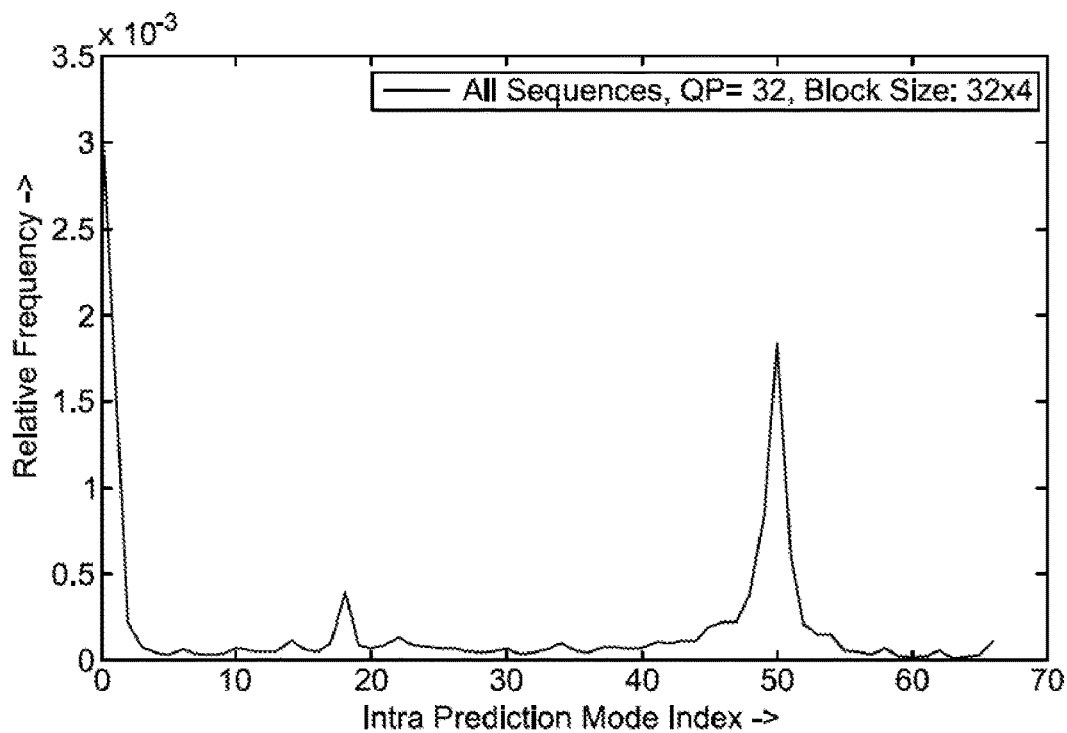
FIG. 4 illustrates relative frequency of prediction modes for a target with height=32 and width=4.

The truncated unary coding of the MPM mode, as shown in Table 4, assumes that the MPM modes with lower indices are more probable than those having higher indices. In general, the prediction modes of the left and top CUs are correlated with the current block prediction mode. If the current block is not square, it is experimentally seen that one prediction mode is more correlated than the other. In general, if the block is flat, that is, if its width is larger than its height, then the prediction mode of the left block is more correlated than that of the top block. Similarly, if the block is tall, that is, its height is longer than its width, then the prediction mode of the top block is more correlated than that of the left. This can be interpreted based on the location of the left and top CUs with respect to the top-left corner of the target block in FIG. 2. Another observation is that, when the block is flat, the horizontal mode HOR_IDX is more probable than the vertical mode VER_IDX. Similarly, when the block is tall, the vertical mode VER_IDX is more probable than the horizontal mode HOR_IDX. This can be seen in FIG. 3 and FIG. 4, which show relative frequencies of different prediction modes for blocks of size 4×32 and 32×4.

Another point to note is that since NUM_LUMA_MODES is equal to 67 (i.e., the total number of prediction modes for a luma target block is 67), the values of the parameters "offset" and "mod" are equal to 62 and 65 respectively. Computing the adjacent modes (L−1, L+1, etc.) using a remainder operator with 65 is not very hardware-efficient. As has been done in HEVC with 35 prediction modes, we can use offset=61 and mod=64. Finding the remainder for a division with 64 can be implemented with bitwise AND operation with 63 (0x3F).

The computation of adjacent modes can be implementation dependent. The usage of offset and mod is required for a general formula which applies to all modes in the range [2-66]. But, the usage is only required for the modes 2 and 66. For the remaining modes, the adjacent modes can simply be computed as adding 1 and subtracting 1. If we need the neighbors at ±2, then the formula will be required only for the modes 2, 3, 65 and 66.

When the offset is 61 and mod is 64, it makes 65 as the left adjacent mode of mode 2. Similarly, 3 becomes the right adjacent mode of mode 66. Considering that mode 2 and 66 are collinear (but point in opposite directions), this adjacency is fine. On the other hand, when offset is 62 and mod is 65, as used in JVET-L0222, the left adjacent mode of mode 2 is 66, and the right adjacent mode of mode 66 is 2. Even in that case, we need the formula only for the modes 2 and 66.

For specific cases, like modes 2 and 66, we can use the values directly instead of using the formula for computation.

Therefore, one difference between JVET-L0222 and our method is in finding the neighbors of mode 2 and mode 66. In the former case, the left neighbor of 2 is 66, and the right neighbor of mode 66 is mode 2. In our case, the left neighbor of mode 2 is mode 65, and the right neighbor of mode 66 is mode 3 (imagine mode 2 and mode 66 as one direction). For all other cases, the neighbors at ±1 are identical for both methods. Similarly, in the case of neighbors at ±2, the difference lies only for the modes 2, 3, 65, and 66 (left modes of 2, 3 and right modes of 65 and 66) and, for the rest of the cases, they are identical for both methods.

First Method

Based on the above observations, we propose to modify the MPM list generation as in the following. Note that DIA_IDX and VDIA_IDX denote the diagonal (mode 34) and vertical diagonal (mode 66) modes, respectively.

```
L = prediction mode of the left CU (value in range [0-66])
A = prediction mode of the above CU (value in range [0-66])
offset = NUM_LUMA_MODES - 6 (=61);
mod = offset + 3 (=64);
Initialization:
   MPM[0] = L;
   MPM[1] = !L
   If WIDTH > HEIGHT
      MPM[2] = HOR_IDX
      MPM[3] = VER_IDX
      MPM[4] = HOR_IDX - 1
      MPM[5] = HOR_IDX + 1
   Else if WIDTH < HEIGHT
      MPM[2] = VER_IDX
      MPM[3] = HOR_IDX
      MPM[4] = VER_IDX - 1
      MPM[5] = VER_IDX + 1
   Else
      MPM[2] = VER_IDX
      MPM[3] = HOR_IDX
      MPM[4] = VDIA_IDX
      MPM[5] = DIA_IDX
If L = A
   If L > DC_IDX
      MPM[0] = L;
      MPM[1] = PLANAR_IDX
      MPM[2] = DC_IDX
      MPM[3] = HOR_IDX, if L ≥ DIA_IDX
              VER_IDX, otherwise
      MPM[4] = ((L + offset) % mod) + 2
      MPM[5] = ((L - 1) % mod) + 2
   Else,
      Use initialized values.
Else (i.e. if L ≠ A)
   If L > DC_IDX and A > DC_IDX
      If WIDTH < HEIGHT
         MPM[0] = A;
         MPM[1] = L
      Else
         MPM[0] = L
         MPM[1] = A
      MPM[2] = PLANAR_IDX
      MPM[3] = DC_IDX
      If WIDTH > HEIGHT
```

$$MPM[4] = ((L + \text{offset}) \% \text{ mod}) + 2, \text{ if } L \text{ and } A \text{ are not adjacent}$$
$$= ((L + \text{offset} - 1) \% \text{ mod}) + 2, \text{ otherwise}$$

$$MPM[5] = ((L - 1) \% \text{ mod}) + 2, \text{ if } L \text{ and } A \text{ are not adjacent}$$
$$= ((L - 0) \% \text{ mod}) + 2, \text{ otherwise}$$

Else if WIDTH < HEIGHT $$MPM[4] = ((A + \text{offset}) \% \text{ mod}) + 2, \text{ if } L \text{ and } A \text{ are not adjacent}$$
$$= ((A + \text{offset} - 1) \% \text{ mod}) + 2, \text{ otherwise}$$

$$MPM[5] = ((A - 1) \% \text{ mod}) + 2, \text{ if } L \text{ and } A \text{ are not adjacent}$$
$$= ((A - 0) \% \text{ mod}) + 2, \text{ otherwise}$$

Else $$MPM[4] = ((\max(L, A) + \text{offset}) \% \text{ mod}) + 2, \text{ if } L \text{ and } A \text{ are not adjacent}$$
$$= ((\max(L, A) + \text{offset} - 1) \% \text{ mod}) + 2, \text{ otherwise}$$

$$MPM[5] = ((\max(L, A) - 1) \% \bmod) + 2, \text{ if } L \text{ and } A \text{ are not adjacent}$$
$$= ((\max(L, A) - 0) \% \bmod) + 2, \text{ otherwise}$$

```
Else if L + A ≥ 2 (i.e., only one out of L and A is either DC or PLANAR)
    MPM[0] = L;
    MPM[1] = A
    MPM[2] = !(min(L, A))
    MPM[3] = HOR_IDX, if max(L, A) ≥ DIA_IDX
           = VER_IDX, otherwise
    MPM[4] = ((max(L, A) + offset) % mod) + 2
    MPM[5] = ((max(L, A) − 1) % mod) + 2
Else (i.e. one of L and A is PLANAR and the other is DC)
    Use the initialized values.
```

Second Method

In the second method, we combine the cases for a square block and a tall block in the above algorithm, as in the following:

```
Initialization:
  MPM[0] = L;
  MPM[1] = !L
  If WIDTH > HEIGHT
      MPM[2] = HOR_IDX
      MPM[3] = VER_IDX
      MPM[4] = HOR_IDX − 1
      MPM[5] = HOR_IDX + 1
  Else
      MPM[2] = VER_IDX
      MPM[3] = HOR_IDX
      MPM[4] = VER_IDX − 1
      MPM[5] = VER_IDX + 1
If L = A
  If L > DC_IDX
      MPM[0] = L;
      MPM[1] = PLANAR_IDX
      MPM[2] = DC_IDX
      MPM[3] = HOR_IDX if L ≥ DIA_IDX
               VER_IDX, otherwise
      MPM[4] = ((L + offset) % mod) + 2
      MPM[5] = ((L − 1) % mod) + 2
  Else,
      Use initialized values.
Else (i.e. if L ≠ A)
        If L > DC_IDX and A > DC_IDX
           If WIDTH < HEIGHT
              MPM[0] = A;
              MPM[1] = L
           Else
              MPM[0] = L
              MPM[1] = A
         MPM[2] = PLANAR_IDX
         MPM[3] = DC_IDX
         If WIDTH > HEIGHT
```

$$MPM[4] = ((L + \text{offset}) \% \bmod) + 2, \text{ if } L \text{ and } A \text{ are not adjacent}$$
$$= ((L + \text{offset} - 1) \% \bmod) + 2, \text{ otherwise}$$

$$MPM[5] = ((L - 1) \% \bmod) + 2, \text{ if } L \text{ and } A \text{ are not adjacent}$$
$$= ((L - 0) \% \bmod) + 2, \text{ otherwise}$$

Else $$MPM[4] = ((A + \text{offset}) \% \bmod) + 2, \text{ if } L \text{ and } A \text{ are not adjacent}$$
$$= ((A + \text{offset} - 1) \% \bmod) + 2, \text{ otherwise}$$

```
            MPM[5] = ((A − 1) % mod) + 2, if L and A are not adjacent
                   = ((A − 0) % mod) + 2, otherwise
        Else if L + A ≥ 2 (i.e., only one out of L and A is either DC or PLANAR)
            MPM[0] = L;
```

```
    MPM[1] = A
    MPM[2] = !(min(L, A))

MPM[3] = HOR_IDX, if max(L, A) ≥ DIA_IDX
           = VER_IDX, otherwise

MPM[4] = ((max(L, A) + offset) % mod) + 2
    MPM[5] = ((max(L, A) −1) % mod) + 2
Else (i.e. one of L and A is PLANAR and the other is DC)
    Use the initialized values.
```

Since the vertical predictions are more likely than horizontal prediction in natural imagery (which was the reason for including mode VER_IDX in the MPM list in HEVC standard), we do not present the combination of the flat block case with the square block case to have another variation of the proposed method.

Note that, in both methods, when L=A, and L>DC_IDX, or when L≠A and L+A≥2, we have used either the vertical mode (VER_IDX) or the horizontal mode (HOR_IDX) replacing the neighbor mode at L−2 (or A−2) and we have placed it at a lower position (index 3 than index 5) giving it higher preference. This part of the original algorithm can be kept unchanged, or changed otherwise as:

```
If L = A and L > DC_IDX
    MPM[0] = L;
    MPM[1] = PLANAR_IDX
    MPM[2] = DC_IDX MPM[3] = HOR_IDX, if L > DIA_IDX & WIDTH > HEIGHT
           = VER_IDX, if L < DIA_IDX & WIDTH < HEIGHT
           = ((L + offset − 1) % mod) + 2, otherwise MPM[4] = ((L + offset) % mod) + 2
    MPM[5] = ((L − 1) % mod) + 2
If L ≠ A and L + A ≥ 2
    MPM[0] = L;
    MPM[1] = A
    MPM[2] = !(min(L, A))

MPM[3] = HOR_IDX, if max(L, A) > DIA_IDX & WIDTH > HEIGHT
           = VER_IDX, if max(L, A) < DIA_IDX & WIDTH < HEIGHT
           = ((max(L, A) + offset − 1) % mod) + 2, otherwise MPM[4] = ((max(L, A) + offset) % mod) + 2
    MPM[5] = ((max(L, A) − 1) % mod) + 2
```

We observe that, in both methods, the PLANAR and DC modes always exist in the MPM list. A simple variation can also be made by removing the PLANAR and DC modes from the list when both the left and top block prediction modes are angular and are separated by more than 2. In this case, we can include the four adjacent neighbors of the two modes besides those modes, as follows:

```
If WIDTH > HEIGHT
    MPM[0] = L
    MPM[1] = A
    MPM[2] = ((L + offset) % mod) + 2
    MPM[3] = ((L − 1) % mod) + 2
    MPM[4] = ((A + offset) % mod) + 2
    MPM[5] = ((A − 1) % mod) + 2
Else
    MPM[0] = A;
    MPM[1] = L
    MPM[2] = ((A + offset) % mod) + 2
    MPM[3] = ((A − 1) % mod) + 2
    MPM[4] = ((L + offset) % mod) + 2
    MPM[5] = ((L − 1) % mod) + 2
```

In the following, we present several embodiments that include the proposals presented above. In the embodiments we assume the VVC VTM 2.0.1 codec with 67 intra prediction modes.

Additional Embodiment 1

Figure 5:
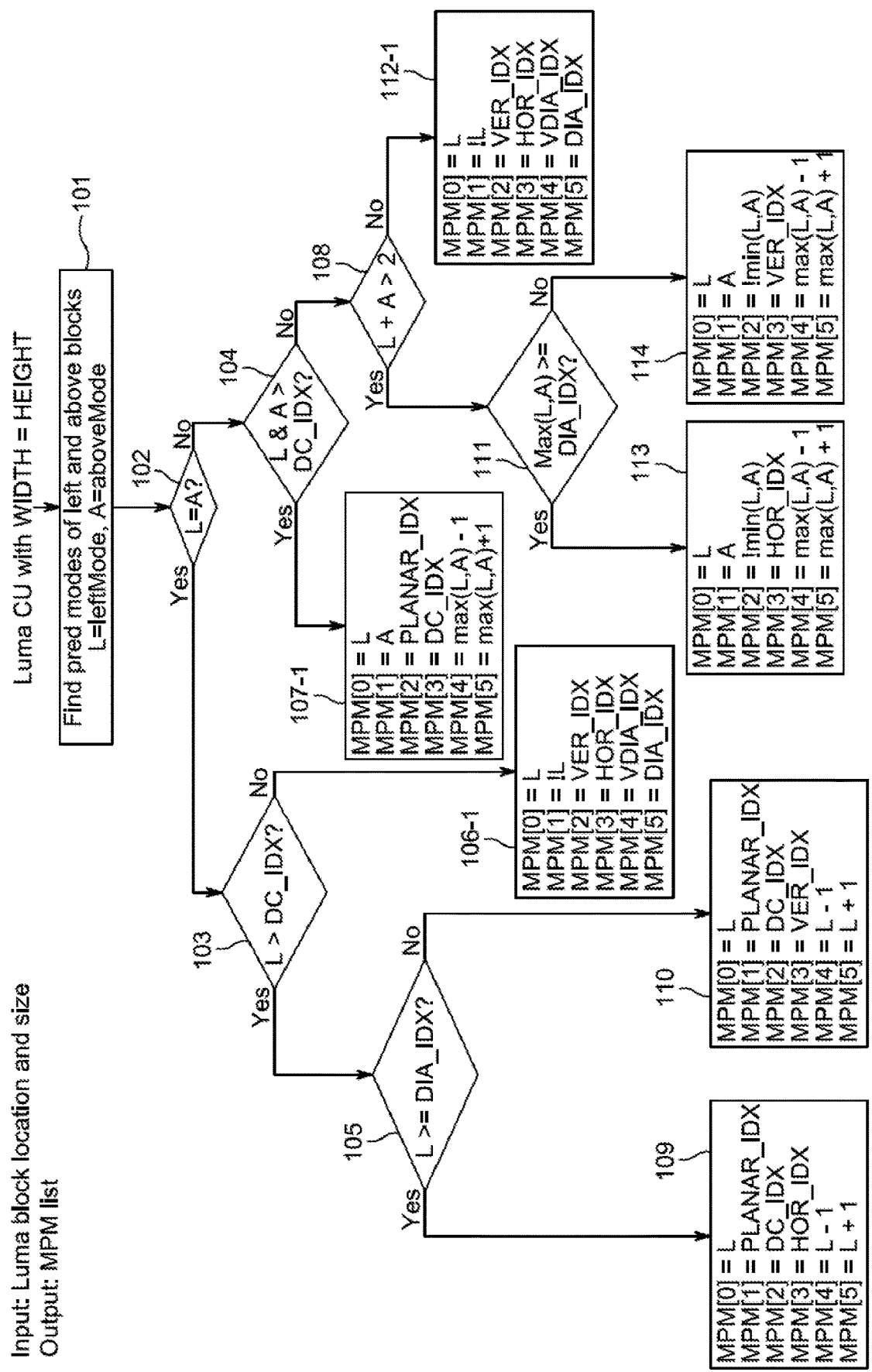
FIG. 5 illustrates a process when a target luma block is a square (WIDTH=HEIGHT), according to an embodiment.
Figure 6:
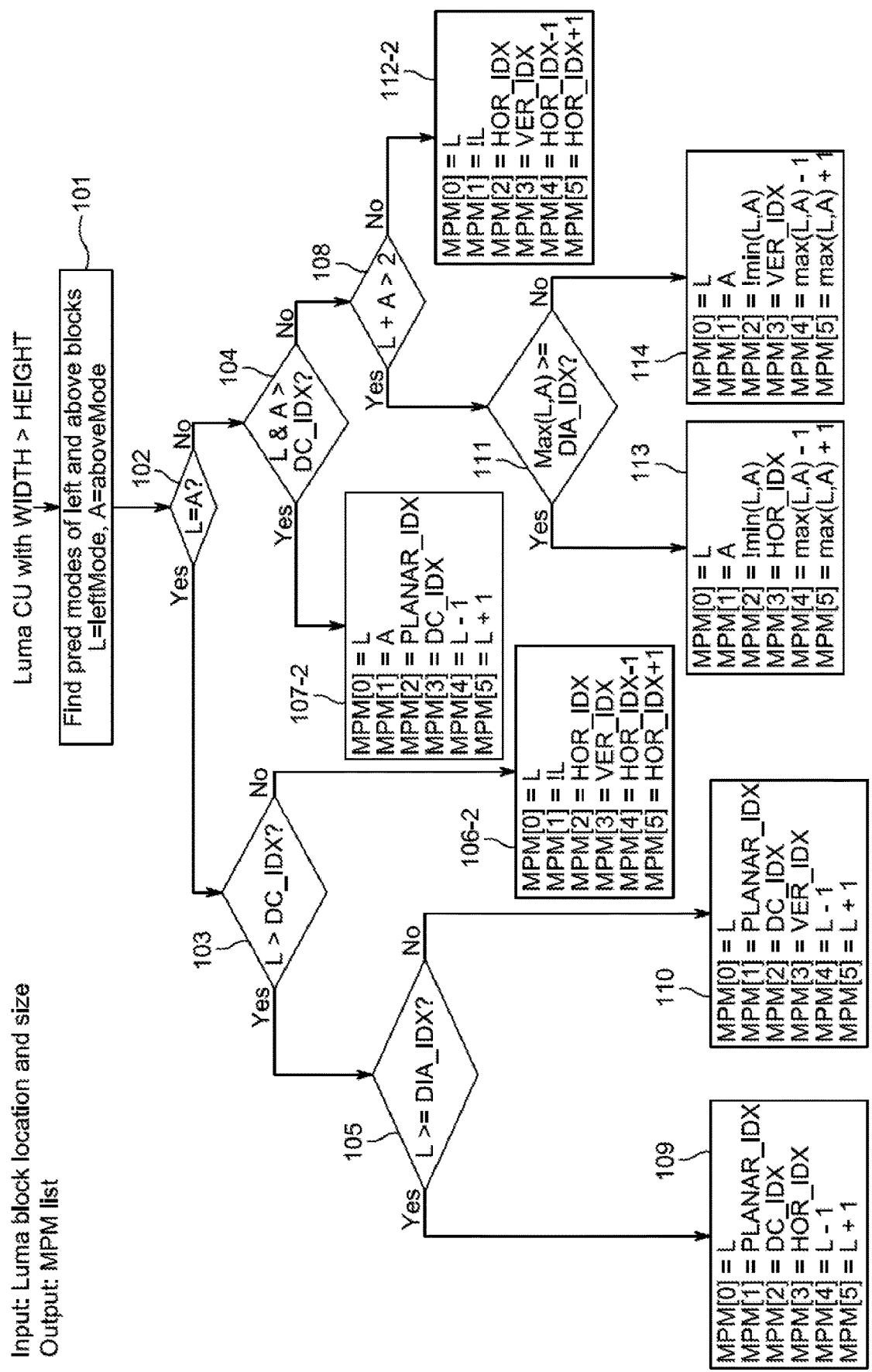
FIG. 6 illustrates a process when a target luma block is flat (WIDTH>HEIGHT), according to an embodiment.
Figure 7:
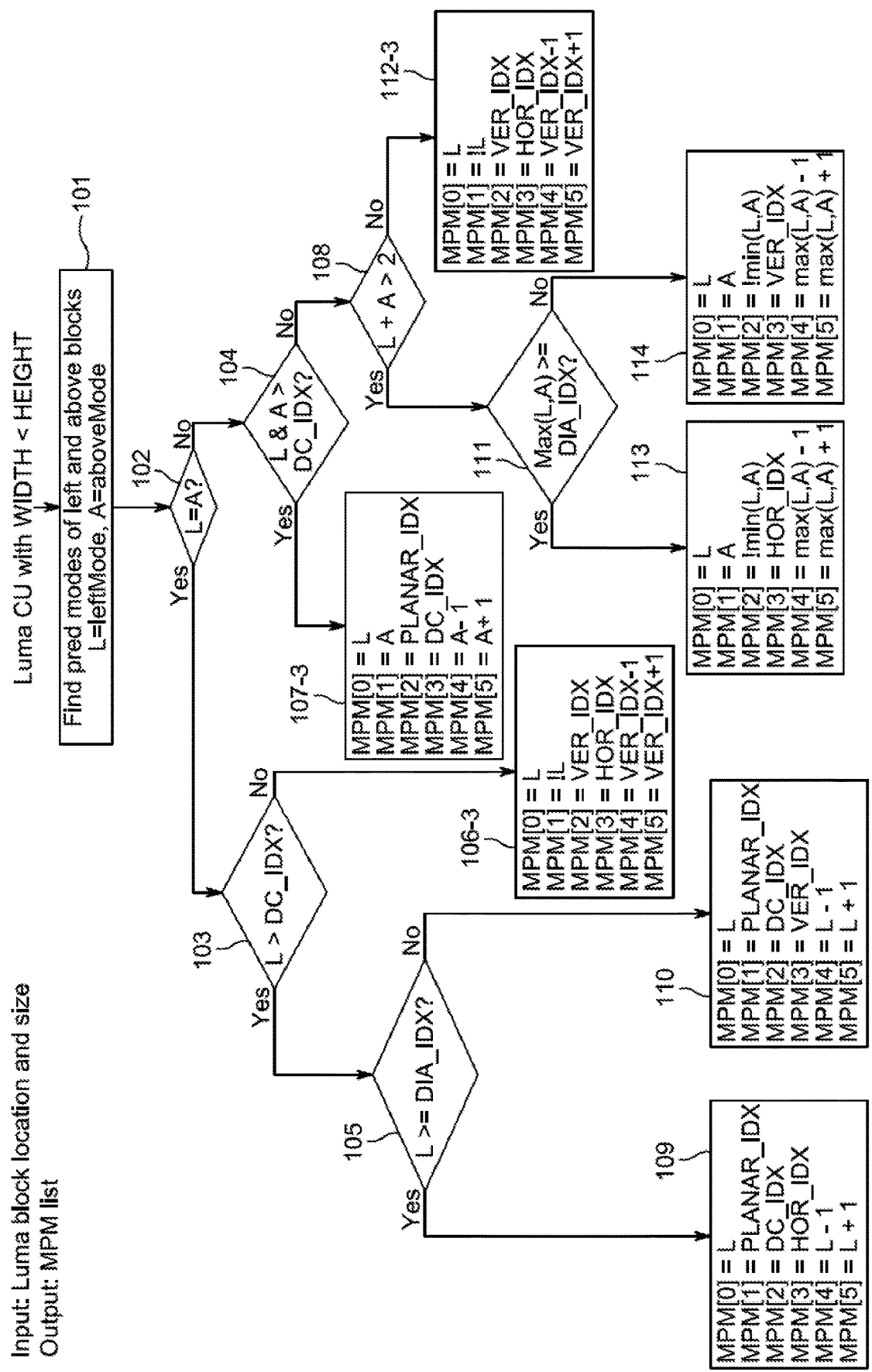
FIG. 7 illustrates a process when a target luma block is tall (WIDTH<HEIGHT), according to an embodiment.

In this embodiment, the MPM list for a target luma block is derived using the first method. If the prediction mode of the target block belongs to the list, mpmFlag is set and the index of the candidate MPM mode which equals the prediction mode is encoded using the binarization in Table 4. Else, the prediction mode is encoded with the truncated binary code as in JVET-L0222. The flowchart (which is self-explanatory) for this embodiment is shown in FIGS. 5-7 for the cases for square blocks (WIDTH=HEIGHT), flat blocks (WIDTH>HEIGHT), and tall blocks (WIDTH<HEIGHT), respectively. For simplicity reason, we do not show the exact formula for the neighbor mode derivations, but use only ∓1 to denote the respective neighbors. The differences among the three flowgraphs are in the blocks 106, 107, and 112 (denoted respectively as 106-1, 107-1 and 112-1 in FIGS. 5; 106-2, 107-2 and 112-2 in FIGS. 6; 106-3, 107-3 and 112-3 in FIG. 7).

Additional Embodiment 2

In this embodiment, the MPM list for a target luma block is derived using the second method. If the prediction mode of the target block belongs to the list, mpmFlag is set and the index of the candidate MPM mode which equals the prediction mode is encoded using the binarization in Table 4. Else, the prediction mode is encoded with the truncated binary code as in JVET-L0222.

Additional Embodiment 3

In this embodiment, the MPM list is derived as in embodiment 1, but instead of including the adjacent modes of the left or top block, we include the modes at a distance ∓2 from those modes. In case the difference between the modes L and A is equal to 2, we use the modes at ∓1.

Additional Embodiment 4

In this embodiment the MPM list is derived as in embodiment 2, but instead of including the adjacent modes of the left or top block, we include the modes at a distance ∓2 from those modes. In case the difference between the modes L and A is equal to 2, we use the modes at ∓1.

Additional Embodiment 5

VTM software initially contained 35 intra prediction modes as in HEVC. The number of modes was increased to 67 to support directions at finer resolution which is possible with supported larger block size. Keeping that in mind, we can generate the MPM list using a mixed scheme depending on the block size. If the block size, measured, for example, as the sum of height and width, is small (for example, height+width≤32), we can use the neighboring modes at ∓2 (as in Embodiment 3), else we can use the adjacent modes (as in embodiment 1).

Additional Embodiment 6

In this embodiment, we follow any one of the embodiments 1-5. The option of using the proposed MPM derivation is signaled in a slice/tile header indicating that all luma CUs in the slice/tile use this MPM derivation method.

Additional Embodiment 7

In this embodiment, we follow any one of the embodiments 1-5. The option of using the proposed MPM derivation is signaled in the Picture Parameter Set (PPS) indicating that all luma CUs in a frame use this MPM derivation method.

Additional Embodiment 8

In this embodiment, we follow any one of the embodiments 1-5. The option of using the proposed MPM derivation is signaled in the Sequence Parameter Set (SPS) indicating that all luma CUs in the sequence use this MPM derivation method.

We implemented the proposed MPM list generations over the VTM 2.0.1 codec with All Intra (AI) configuration and one frame from each test sequence. The results were compared with the results obtained with the method from JVET-L0222 for the same AI configuration with one frame from each test sequence. In the first experiment, we used the same values for the "offset" and "mod" (offset=62, mod=65) as used in JVET-L0222. The BD-rate performance is shown in Table 5.

TABLE 5

BD-rate performance of the proposed MPM derivation compared to the MPM derivation in JVET-L0222. Offset = 62 and mod = 65.

| | Over VTM-2.0.1 | | | | |
|---|---|---|---|---|---|
| | Y | U | V | EncT | DecT |
| Class A1 | −0.08% | 0.12% | −0.12% | 100% | 100% |
| Class A2 | 0.03% | 0.07% | −0.08% | 100% | 101% |
| Class B | −0.09% | 0.06% | 0.17% | 100% | 102% |
| Class C | −0.05% | −0.47% | −0.16% | 100% | 105% |
| Class E | 0.01% | 0.12% | −0.36% | 101% | 97% |
| Overall | −0.04% | −0.03% | −0.08% | 100% | 101% |
| Class D | 0.08% | −0.45% | −0.11% | 101% | 104% |

In the second experiment, we used offset equal to 61 and mod=64, as we have used in our proposal. The BD-rate performance is shown in Table 6.

TABLE 6

BD-rate performance of the proposed MPM derivation compared to the MPM derivation in JVET-L0222. Offset = 61 and mod = 64.

| | Over VTM-1.0 | | | | |
|---|---|---|---|---|---|
| | Y | U | V | EncT | DecT |
| Class A1 | −0.11% | 0.52% | −0.05% | 100% | 99% |
| Class A2 | −0.04% | 0.40% | −0.14% | 100% | 102% |
| Class B | −0.10% | 0.03% | −0.15% | 100% | 101% |
| Class C | −0.09% | −0.31% | −0.18% | 99% | 99% |
| Class E | 0.06% | −0.45% | −0.63% | 100% | 95% |
| Overall | −0.06% | 0.02% | −0.22% | 99% | 99% |
| Class D | −0.03% | 0.01% | 0.64% | 101% | 100% |

As we see, our proposal gains about 0.06% luma BD-rate over JVET-L0222 with about the same complexity.

Accordingly, one advantage of the proposed embodiments is that they increase the probability of higher probable MPM modes to have lower indices leading to better compression efficiency. Furthermore, the search for the candidate prediction mode would take lesser time since the more probable modes have lower indices. This, therefore, would result in lower complexity at the encoder and decoder.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 8:
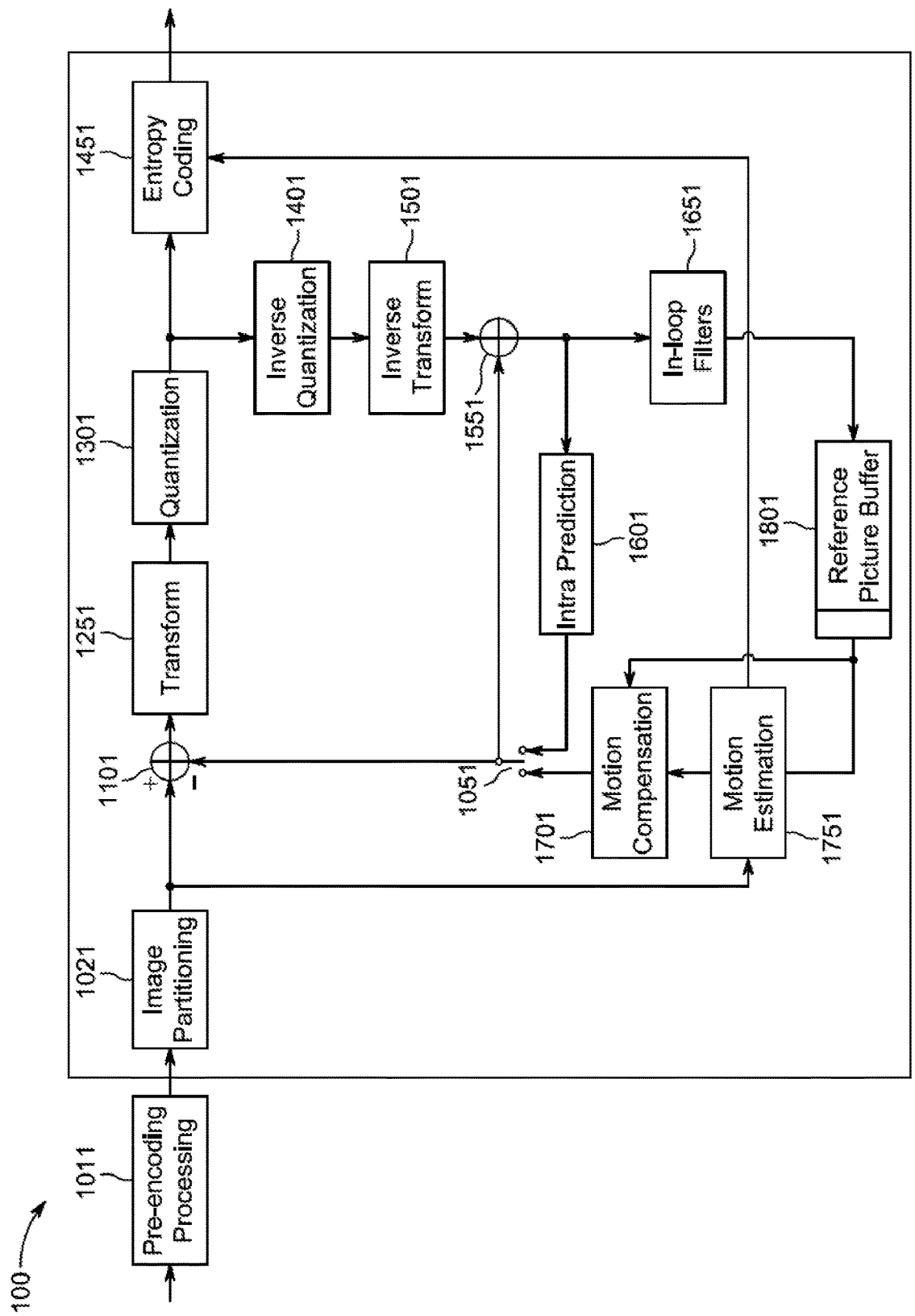
FIG. 8 illustrates a block diagram of an embodiment of a video encoder.
Figure 9:
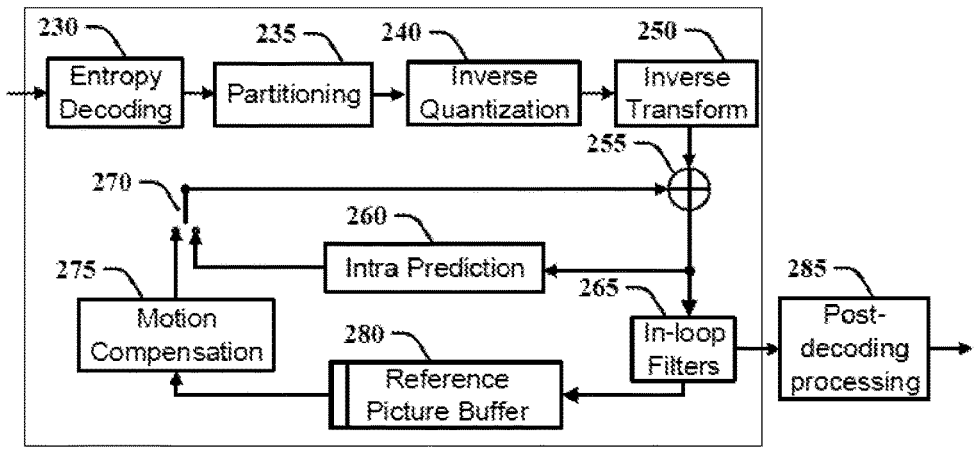
FIG. 9 illustrates a block diagram of an embodiment of a video decoder.
Figure 10:
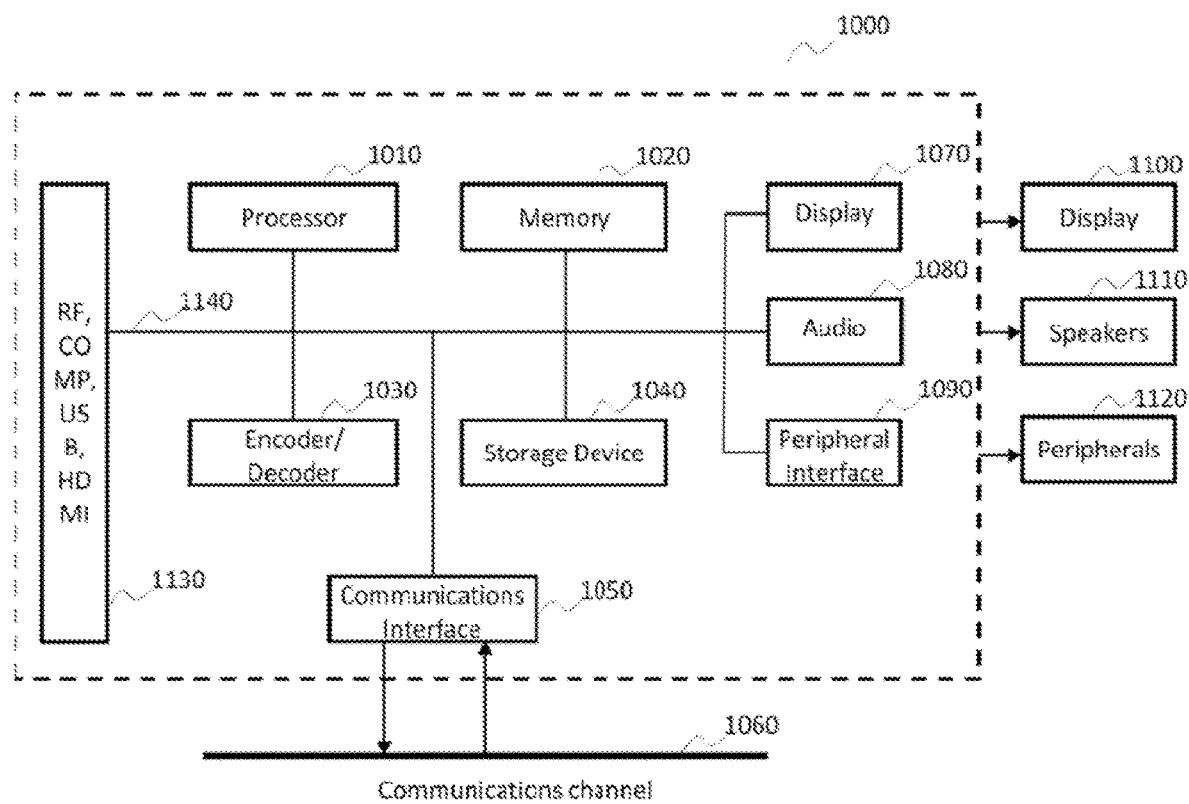
FIG. 10 illustrates a block diagram of a system within which aspects of the present embodiments may be implemented.

The aspects described and contemplated in this application can be implemented in many different forms. FIGS. 8, 9 and 10 below provide some embodiments, but other embodiments are contemplated and the discussion of FIGS. 8, 9 and 10 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction modules (1601, 260), of a video encoder 100 and decoder 200 as shown in FIG. 8 and FIG. 9. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 8 illustrates an encoder 100. Variations of this encoder 100 are contemplated, but the encoder 100 is described below for purposes of clarity without describing all expected variations.

Before being encoded, the video sequence may go through pre-encoding processing (1011), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (1021) and processed in units of, for example, CUs. Each unit is encoded using, for example, either an intra or inter mode. When a unit is encoded in an intra mode, it performs intra prediction (1601). In an inter mode, motion estimation (1751) and compensation (1701) are performed. The encoder decides (1051) which one of the intra mode or inter mode to use for encoding the unit, and indicates the intra/inter decision by, for example, a prediction mode flag. Prediction residuals are calculated, for example, by subtracting (1101) the predicted block from the original image block.

The prediction residuals are then transformed (1251) and quantized (1301). The quantized transform coefficients, as well as motion vectors and other syntax elements, are entropy coded (1451) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (1401) and inverse transformed (1501) to decode prediction residuals. Combining (1551) the decoded prediction residuals and the predicted block, an image block is reconstructed. In-loop filters (1651) are applied to the reconstructed picture to perform, for example, deblocking/SAO (Sample Adaptive Offset) filtering to reduce encoding artifacts. The filtered image is stored at a reference picture buffer (1801).

FIG. 9 illustrates a block diagram of a video decoder 200. In the decoder 200, a bitstream is decoded by the decoder elements as described below. Video decoder 200 generally performs a decoding pass reciprocal to the encoding pass as described in FIG. 8. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (1011). The post-decoding processing can use metadata derived in the pre-encoding processing and signaled in the bitstream.

FIG. 10 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other devices. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The invention claimed is:

1. A method for video decoding, comprising:
   obtaining a list comprising a number of intra prediction mode candidates for a current block depending on a shape of the current block, wherein modes at distance −2 and distance 2 from an intra prediction mode of a left or top neighbor block are included in the list, depending on if the current block is flat or tall, respectively, wherein an adjacent mode is computed using a remainder operation with an offset set to 61 and a mod set to 64, when there are 67 intra prediction modes; and
   decoding the current block based on the list.

2. The method of claim 1, wherein the modes at distance 2 and distance −2 are included in the list when a size of the current block is smaller than a threshold.

3. The method of claim 1, wherein the intra prediction mode candidates in the list are ordered based on the shape of the current block.

4. The method of claim 1, wherein one or more adjacent modes of a directly horizontal mode or a directly vertical mode are included in the list if the current block is flat or tall, respectively.

5. The method of claim 1, wherein the size of the current block is measured as a sum of height and width of the current block.

6. An apparatus for video decoding, comprising one or more processors, wherein the one or more processors are configured to:
   obtain a list comprising a number of intra prediction mode candidates for a current block depending on a shape of the current block, wherein modes at distance −2 and distance 2 from an intra prediction mode of a left or top neighbor block are included in the list, depending on if the current block is flat or tall, respectively, wherein an adjacent mode is computed using a remainder operation with an offset set to 61 and a mod set to 64, when there are 67 intra prediction modes; and
   decode the current block based on the list.

7. The apparatus of claim 6, wherein the modes at distance 2 and distance −2 are included in the list when a size of the current block is smaller than a threshold.

8. The apparatus of claim 6, wherein leftMode or aboveMode is placed first in the list if the current block is flat or tall, respectively.

9. The apparatus of claim 6, wherein one or more adjacent modes of a directly horizontal mode or a directly vertical mode are included in the list if the current block is flat or tall, respectively.

10. The apparatus of claim 6, wherein the size of the current block is measured as a sum of height and width of the current block.

11. A method for video encoding, comprising:
obtaining a list comprising a number of intra prediction mode candidates for a current block depending on a shape of the current block, wherein modes at distance −2 and distance 2 from an intra prediction mode of a left or top neighbor block are included in the list, depending on if the current block is flat or tall, respectively, wherein an adjacent mode is computed using a remainder operation with an offset set to 61 and a mod set to 64, when there are 67 intra prediction modes; and
encoding the current block based on the list.

12. The method of claim 11, wherein the modes at distance 2 and distance −2 are included in the list responsive to that a size of the current block is smaller than a threshold.

13. The method of claim 11, wherein the intra prediction mode candidates in the list are ordered based on the shape of the current block.

14. The method of claim 11, wherein one or more adjacent modes of HOR_IDX or VER_IDX are included in the list if the current block is flat or tall, respectively.

15. The method of claim 11, wherein the size of the current block is measured as a sum of height and width of the current block.

16. An apparatus for video encoding, comprising one or more processors, wherein the one or more processors are configured to:
obtain a list comprising a number of intra prediction mode candidates for a current block depending on a shape of the current block, wherein modes at distance −2 and distance 2 from an intra prediction mode of a left or top neighbor block are included in the list, depending on if the current block is flat or tall, respectively, wherein an adjacent mode is computed using a remainder operation with an offset set to 61 and a mod set to 64, when there are 67 intra prediction modes; and
encode the current block based on the list.

17. The apparatus of claim 16, wherein the modes at distance 2 and distance −2 are included in the list when a size of the current block is smaller than a threshold.

18. The apparatus of claim 16, wherein leftMode or aboveMode is placed first in the list if the current block is flat or tall, respectively.

19. The apparatus of claim 16, wherein one or more adjacent modes of HOR_IDX or VER_IDX are included in the list if the current block is flat or tall, respectively.

20. The apparatus of claim 16, wherein the size of the current block is measured as a sum of height and width of the current block.

* * * * *